(12) United States Patent
Kato

(10) Patent No.: US 9,894,313 B1
(45) Date of Patent: Feb. 13, 2018

(54) VIDEO SIGNAL PROCESSING METHOD, INTEGRATED CIRCUIT FOR VIDEO SIGNAL PROCESSING, AND VIDEO SIGNAL PROCESSING APPARATUS

(71) Applicant: JOLED INC., Tokyo (JP)

(72) Inventor: Toshiyuki Kato, Tokyo (JP)

(73) Assignee: JOLED INC., Tokyo (JP)

( * ) Notice: Subject to any disclaimer, the term of this patent is extended or adjusted under 35 U.S.C. 154(b) by 0 days.

(21) Appl. No.: 15/658,631

(22) Filed: Jul. 25, 2017

(30) Foreign Application Priority Data

Aug. 9, 2016 (JP) ................................. 2016-156132

(51) Int. Cl.
*H04N 5/57* (2006.01)
*G06T 7/00* (2017.01)

(52) U.S. Cl.
CPC ................ *H04N 5/57* (2013.01); *G06T 7/97* (2017.01); *G06T 2207/10016* (2013.01); *G06T 2207/20021* (2013.01)

(58) Field of Classification Search
CPC ... H04N 5/57; H04N 9/64; H04N 9/77; G06T 7/97; G06T 2207/10016; G06T 2207/20021

USPC .................. 348/687, 571, 708, 712; 382/274
See application file for complete search history.

(56) References Cited

U.S. PATENT DOCUMENTS 7,864,250 B2 * 1/2011 Kanai ...................... H04N 9/68
348/645

FOREIGN PATENT DOCUMENTS

JP          05-027736        2/1993

* cited by examiner

*Primary Examiner* — Sherrie Hsia
(74) *Attorney, Agent, or Firm* — Greenblum & Bernstein, P.L.C.

(57) ABSTRACT

A video signal processing method includes: dividing a current frame which is to be processed into a plurality of blocks which are predetermined rectangular blocks; calculating, for each of the plurality of blocks divided into in the dividing, a feature quantity relating to luminance of pixels in the block; calculating first correction data, based on a feature quantity calculated from each of first blocks located above a first horizontal boundary in the current frame and a feature quantity calculated from each of one or more blocks located below a first horizontal boundary in a previous frame which has been processed immediately before the current frame; and correcting luminance of pixels in each of the first blocks in the current frame, based on the first correction data calculated in the calculating.

9 Claims, 10 Drawing Sheets

VIDEO SIGNAL PROCESSING METHOD, INTEGRATED CIRCUIT FOR VIDEO SIGNAL PROCESSING, AND VIDEO SIGNAL PROCESSING APPARATUS

CROSS REFERENCE TO RELATED APPLICATION

The present application is based on and claims priority of Japanese Patent Application No. 2016-156132 filed on Aug. 9, 2016. The entire disclosure of the above-identified application, including the specification, drawings and claims is incorporated herein by reference in its entirety.

FIELD

The present disclosure relates to a video signal processing method for processing video signals of a plurality of frames, an integrated circuit for video signal processing, and a video signal processing device.

BACKGROUND

Techniques for obtaining, for each frame, feature quantities relating to luminance of the pixels in the frame, and correcting the luminance of the pixels in the frame have been conventionally known (for example, see PTL 1).

The use of this technique makes it possible to generate, for each frame, an image having contrast suitable for the luminance of the frame.

CITATION LIST

Patent Literature

Patent Literature (PTL) 1
Japanese Unexamined Patent Application Publication No. 5-27736

SUMMARY

Technical Problem

However, the above technique is intended to correct luminance on a per frame basis. Thus, according to the method, it is difficult to realize smooth transition of luminance levels between frames when a comparatively large change in luminance level is found between the frames such as a case of a scene change.

The present disclosure was made in view of the above problem, with an aim to provide a video signal processing method, an integrated circuit for video signal processing, and a video signal processing device which realize smoother transition in luminance level between frames than conventional.

Solution to Problem

A video signal processing method according to an aspect of the present disclosure is a video signal processing method for processing video signals of a plurality of frames which are temporally continuous, in time order of the plurality of frames, the video signal processing method including: dividing a current frame which is to be processed into a plurality of blocks using a same dividing method as used for the plurality of frames, the plurality of blocks being predetermined rectangular blocks; calculating, for each of the plurality of blocks divided into in the dividing, a feature quantity relating to luminance of pixels in the block; calculating first correction data, based on a feature quantity calculated from each of first blocks located above a first horizontal boundary in the current frame and a feature quantity calculated from each of one or more blocks located below a first horizontal boundary in a previous frame which has been processed immediately before the current frame; and correcting luminance of pixels in each of the first blocks in the current frame, based on the first correction data calculated in the calculating.

An integrated circuit for video signal processing according to an aspect of the present disclosure is an integrated circuit for video signal processing, the integrated circuit being for processing video signals of a plurality of frames which are temporally continuous, in time order of the plurality of frames and including: a dividing unit configured to divide a current frame which is to be processed into a plurality of blocks using a same dividing method as used for the plurality of frames, the plurality of blocks being predetermined rectangular blocks; a feature quantity calculating unit configured to calculate, for each of the plurality of blocks divided into in the dividing, a feature quantity relating to luminance of pixels in the block; a correction data calculating unit configured to calculate first correction data, based on a feature quantity calculated from each of first blocks located above a first horizontal boundary in the current frame and a feature quantity calculated from each of one or more blocks located below a first horizontal boundary in a previous frame which has been processed immediately before the current frame; and a correcting unit configured to correct luminance of pixels in each of the first blocks in the current frame, based on the first correction data calculated in the calculating.

A video signal processing device according to an aspect of the present disclosure is a video signal processing device which processes video signals of a plurality of frames which are temporally continuous, in time order of the plurality of frames, the video signal processing device including: a dividing unit configured to divide a current frame which is to be processed into a plurality of blocks using a same dividing method as used for the plurality of frames, the plurality of blocks being predetermined rectangular blocks; a feature quantity calculating unit configured to calculate, for each of the plurality of blocks divided into in the dividing, a feature quantity relating to luminance of pixels in the block; a correction data calculating unit configured to calculate first correction data, based on a feature quantity calculated from each of first blocks located above a first horizontal boundary in the current frame and a feature quantity calculated from each of one or more blocks located below a first horizontal boundary in a previous frame which has been processed immediately before the current frame; and a correcting unit configured to correct luminance of pixels in each of the first blocks in the current frame, based on the first correction data calculated in the calculating.

Advantageous Effects

In the video signal processing method, the integrated circuit for video signal processing, and the video signal processing device according to the present disclosure, luminance of pixels of a first block in a current frame which is a frame to be processed is corrected based on both of a feature quantity relating to luminance of a block included in the current frame and a feature quantity relating to luminance of a block included in a previous frame which is a frame processed immediately before the current frame.

For this reason, the video signal processing method, the integrated circuit for video signal processing, and the video signal processing device according to the present disclosure make it possible to realize smoother transition in luminance level between frames than conventional.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENTS

Figure 1:
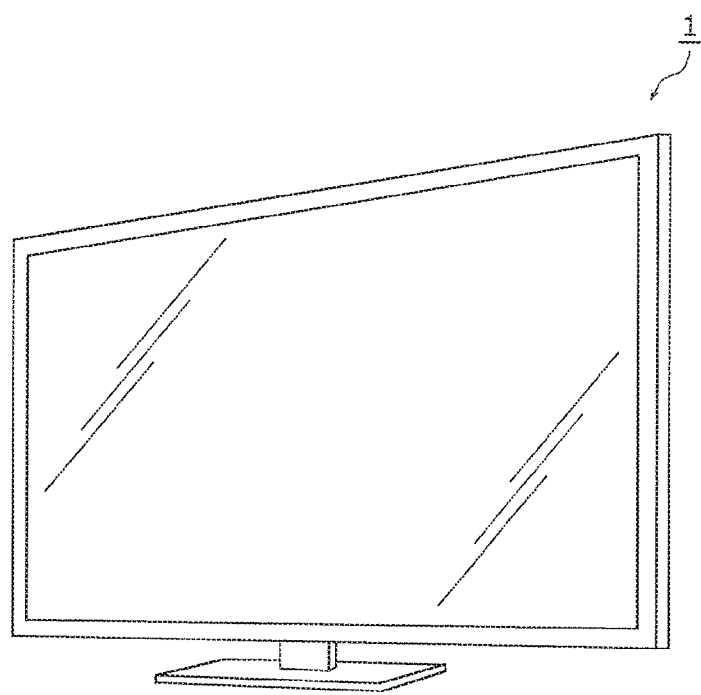
FIG. 1 shows an appearance of a video display apparatus.

Hereinafter, embodiments of the video display apparatus according to an aspect of the present disclosure are described with reference to the drawings. It is to be noted that each of the embodiments described below shows a specific example according to the present disclosure. Accordingly, the numerical values, shapes, materials, constituent elements, the arrangement and connection of the constituent elements, steps, the processing order of the steps etc. shown in the following exemplary embodiments are mere examples, and therefore do not limit the scope of the present disclosure. Therefore, among the constituent elements in the following exemplary embodiments, constituent elements not recited in any one of the independent claims which define the most generic concept of the present disclosure are described as arbitrary constituent elements.

Each of the drawings is a schematic diagram, and thus is not always illustrated precisely. Throughout the drawings, substantially the same elements are assigned with the same reference numerals, and overlapping descriptions are omitted or simplified.

Embodiment 1

[Outline]

Here, a video signal processing device which processes video signals of a plurality of frames which are temporally continuous is described as an aspect of the present disclosure.

The video signal processing device receives inputs, for each frame, video signals on a per line basis starting with the line located at the uppermost side of the frame toward the lower side according to a line scanning method. The video signal processing device divides a current frame to be processed into eighty blocks by dividing the current frame by 8 along horizontal boundaries and by 10 along vertical boundaries. Furthermore, the video signal processing device extracts, for each divided block, an average luminance of the pixels belonging to each divided block as a feature quantity of the block.

Here is a case where a video display apparatus extracts the feature quantity of each block located on and above nth (n is an integer ranging from 1 to 7) horizontal boundary when counted from the uppermost side of a current frame to be processed. In this case, the video display apparatus performs correction of luminance of each block located between the (n−1)th horizontal boundary and the nth horizontal boundary, based on the feature quantity of each block located above the nth horizontal boundary in the current frame to be processed and the feature quantity of each block located below the nth horizontal boundary in a previous frame which has been processed immediately before the current frame.

Hereinafter, the video display apparatus is described in detail with reference to the drawings.

[Configuration]

Figure 2:
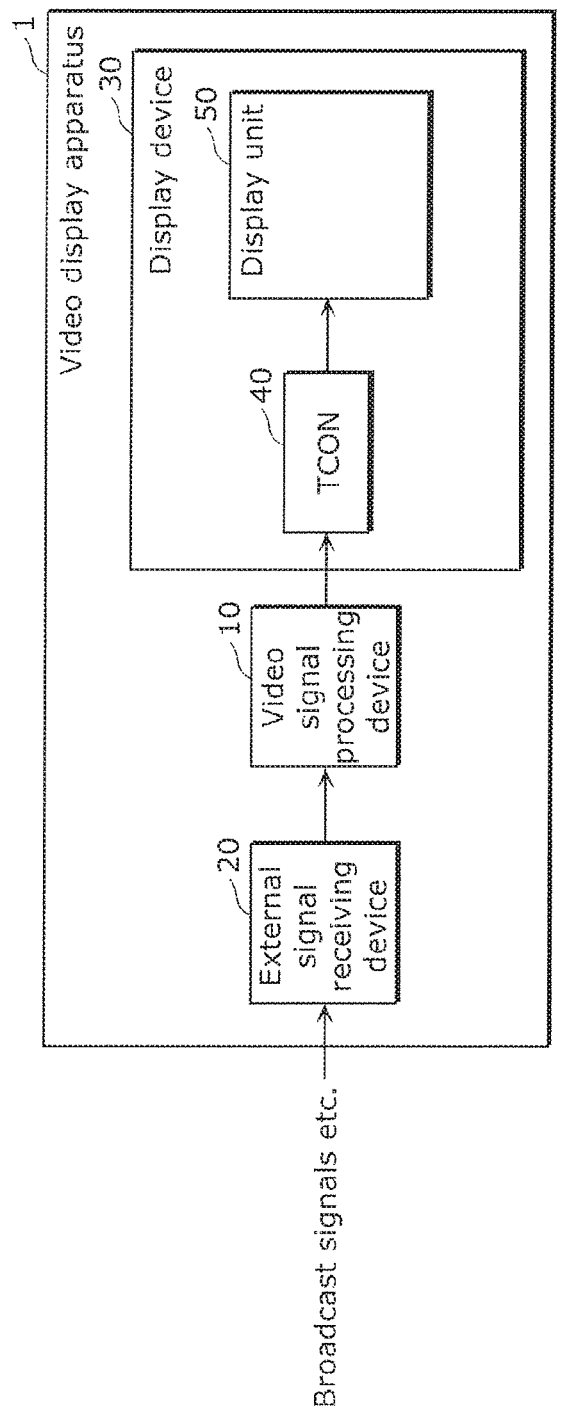
FIG. 2 is a block diagram illustrating a configuration of the video display apparatus.

FIG. 1 shows an appearance of a video display apparatus 1 according to this embodiment. FIG. 2 is a block diagram illustrating a configuration of the video display apparatus 1.

The video display apparatus 1 illustrated in the diagram is, for example, a television which displays video according to video signals such as broadcast signals etc. transmitted from an external broadcast station.

As illustrated in FIG. 2, the video display apparatus 1 is configured to include an external signal receiving device 20, video signal processing device 10, and display device 30.

The external signal receiving device 20 is a signal source which transmits video signals to the video signal processing device 10. The external signal receiving device 20 is, for example, a television set, a set top box (STB), a tuner, or the like which receives broadcast signals transmitted from the broadcast station, converts the received signals into video signals suitable for the display device 30, and outputs the converted video signals. The external signal receiving device 20 generates video signals of a plurality of frames which are temporally continuous by decoding input broadcast signals, and outputs the generated video signals to the video signal processing device 10. Here, video signals are generated in such a manner that resulting frames are arranged in display order. In addition, the external signal receiving device 20 outputs, in each frame, video signals on a per line basis starting with the line located at the uppermost side of the frame toward the lower side according to the line scanning method.

The video signal processing device 10 processes video signals of a plurality of frames which are temporally continuous and output from the external signal receiving device 20, in time order of the plurality of frames. In other words, the video signal processing device 10 calculates correction data for correcting luminance of the pixels in each frame, and based on the calculated correction data, generates video signals of frames having corrected luminance (hereinafter, these video signals are referred to as "corrected video signals"). Subsequently, the video signal processing device 10 outputs the generated corrected video signals to the display device 30.

The video signal processing device 10 is implemented as, for example, an integrated circuit called large scale integration (LSI).

The display device 30 is, for example, an electro luminescent (EL) display which displays video using the corrected video signals output by the video signal processing device 10.

The display device 30 is configured to include a TCON 40 and a display unit 50.

The TCON 40 is a timing controller which causes the display unit 50 to display video according to the corrected video signals output by the video signal processing device 10. In other words, the TCON 40 outputs synchronization signals such as a vertical synchronization signal and a horizontal synchronization signal etc. together with data signal for display to a gate driver (not illustrated) and a source driver (not illustrated) of the display unit 50, and thereby controls light-emitting timings for light-emitting pixel circuits of the display unit 50 and writing timings etc. of signal voltages for causing the display unit 50 to emit light at luminance according to the corrected video signals.

The TCON 40 is, for example, implemented as an integrated circuit called LSI.

The display unit 50 is a light-emitting pixel circuit array which includes a plurality of light-emitting pixel circuits arranged in a matrix. The light-emitting pixel circuits are each arranged at an intersection position between one of a plurality of gate lines to be connected to the gate driver and one of a plurality of source lines to be connected to the source driver. For example, each light-emitting pixel circuit is configured to include an organic EL element which emits light according to a signal voltage, and a transistor which drives the organic EL element.

Figure 3:
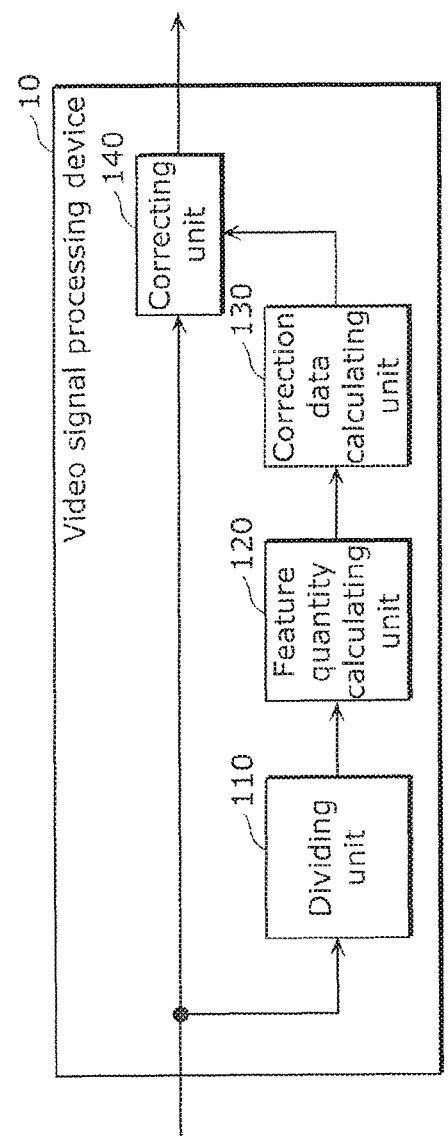
FIG. 3 is a block diagram illustrating a configuration of the video signal processing device.

FIG. 3 is a block diagram illustrating a configuration of the video signal processing device 10.

As illustrated in FIG. 3, the video signal processing device 10 is configured to include a dividing unit 110, a feature quantity calculating unit 120, a correction data calculating unit 130, and a correcting unit 140.

The dividing unit 110 divides a current frame to be processed into a plurality of predetermined rectangular blocks according to the same dividing method for a plurality of frames. More specifically, the current frame to be processed is divided into eighty blocks by dividing the current frame by 8 along horizontal boundaries and by 10 along vertical boundaries.

The feature quantity calculating unit 120 calculates a feature quantity relating to luminance for each block divided by the dividing unit 110. More specifically, the feature quantity calculating unit 120 calculates, as the feature quantity, an average luminance of the pixels in the current block to be processed.

The feature quantity calculating unit 120 calculates, in sequence, feature quantities starting with the block located at the uppermost side of the frame toward the lower side. Since video signals are input from the external signal receiving device 20 on a per line basis starting with the uppermost line in the frame toward the lower line side according to the line scanning method, the feature quantities are calculated in the above sequence so that the feature quantity of a block whose video signal is input earlier can be calculated earlier than the other(s). In addition, the feature quantities of the blocks located on the same horizontal line are sequentially calculated starting with the leftmost block toward the right side.

Here is a case where the feature quantity calculating unit 120 calculates the feature quantity of each of the blocks above an nth (n is an integer ranging from 1 to 7) horizontal boundary which is an nth horizontal dividing line when counted from the uppermost side of the current frame to be processed. In this case, the correction data calculating unit 130 calculates, as correction data, a correction gain for correcting the luminance of the pixels in each of the blocks located between the nth horizontal boundary and an (n−1)th horizontal boundary (hereinafter referred to as "the nth blocks"), based on the feature quantity of each of the blocks located above the nth horizontal boundary in the current frame and a feature quantity of each of blocks located below an nth horizontal boundary in a previous frame which has been processed immediately before the current frame.

Figure 4:
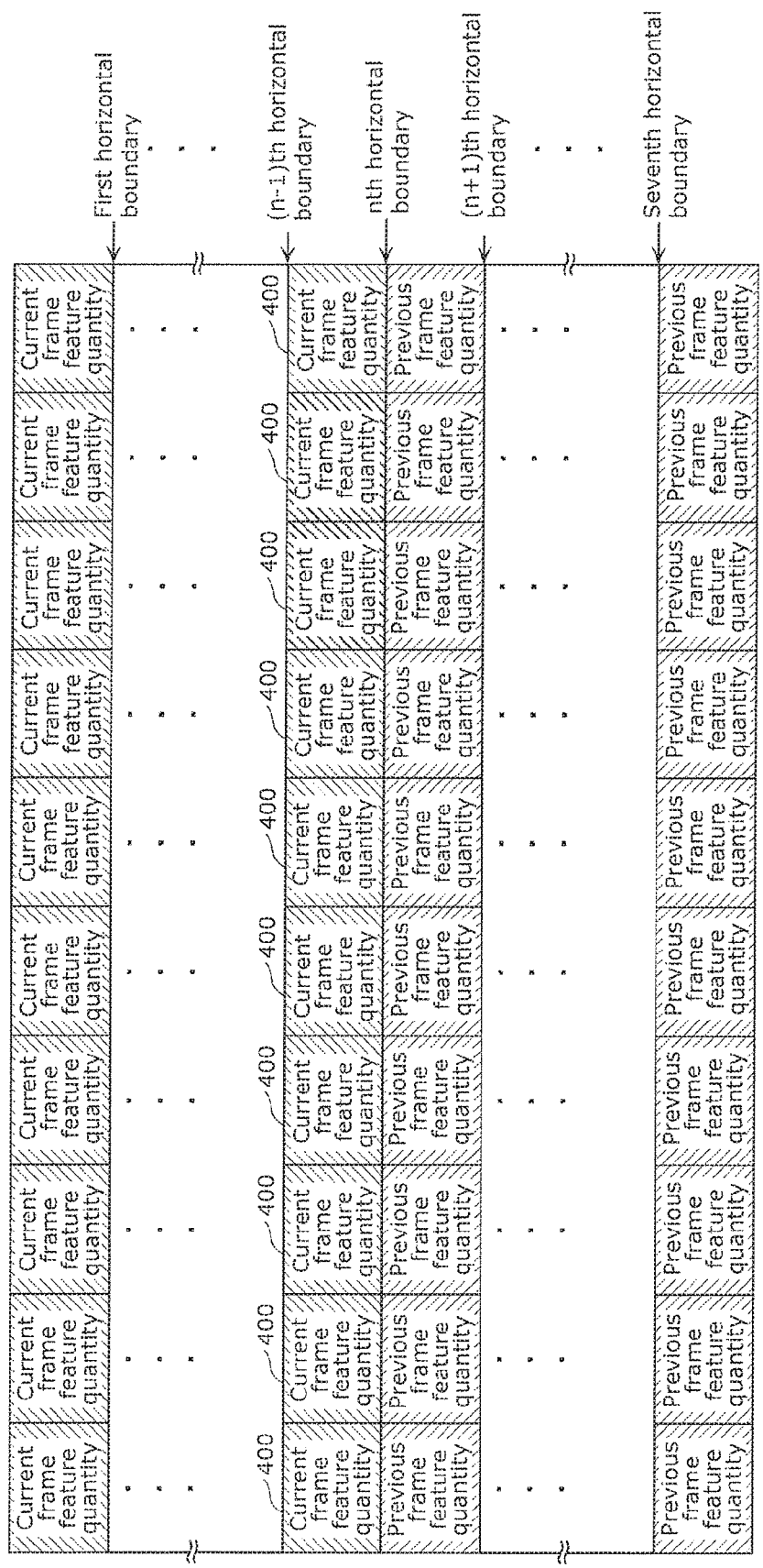
FIG. 4 is a schematic diagram illustrating a feature quantity of each of blocks, which is used by a feature quantity calculating unit.

FIG. 4 is a schematic diagram of the feature quantities of respective blocks which are used when the correction data calculating unit 130 calculates correction data for each nth block 400.

As illustrated in FIG. 4, when calculating the correction data for each nth block 400, the correction data calculating unit 130 calculates the correction data based on the feature quantity of each block located above the nth horizontal boundary in the frame to be processed (current frame) and the feature quantity of each block located below the nth horizontal boundary in the frame which has been processed immediately before the current frame (previous frame).

When the feature quantities of all blocks in the current frame have been calculated by the feature quantity calculating unit 120, the correction data calculating unit 130 calculates, as correction data, a correction gain for correcting luminance of the pixels in each eighth block located below the seventh horizontal line, based on the feature quantity of each block of the current frame.

For example, the correction data calculating unit 130 calculates first correction data based on a feature quantity calculated from each first block located above the first horizontal boundary in the current frame to be processed and a feature quantity calculated from each of at least one block located below the horizontal boundary in the frame which has been processed immediately before the current frame. Here, the first correction data means correction data for correcting luminance of pixels in each first block.

For example, when the feature quantity calculating unit 120 has calculated the feature quantity of each of the plurality of blocks in the current frame in such a manner that the feature quantity of each of blocks located above a lowermost horizontal boundary has been calculated first, and then the feature quantity of each of blocks located below the lowermost horizontal boundary has been calculated (the lowermost horizontal boundary is the horizontal dividing line located at a lowermost side of the current frame), the correction data calculating unit 130 calculates correction data for lowermost blocks based on the feature quantity calculated from each of the blocks in the current frame. Here, the correction data for lowermost blocks means correction data for correcting luminance of pixels in each of the lowermost blocks.

Here is a case where the feature quantity calculating unit 120 calculates the feature quantity of each of the first blocks first and then calculates the feature quantity of each of the second blocks located between the first horizontal boundary and the second horizontal boundary. In this case, the correcting data calculating unit 130 calculates second correction data based on the feature quantity of each of the first blocks and the second blocks in the current frame and a feature quantity of each of blocks located below a second horizontal boundary in the previous frame which has been processed immediately before the current frame. Here, the second correction data means correction data for correcting luminance of pixels in each second block.

Figure 5:
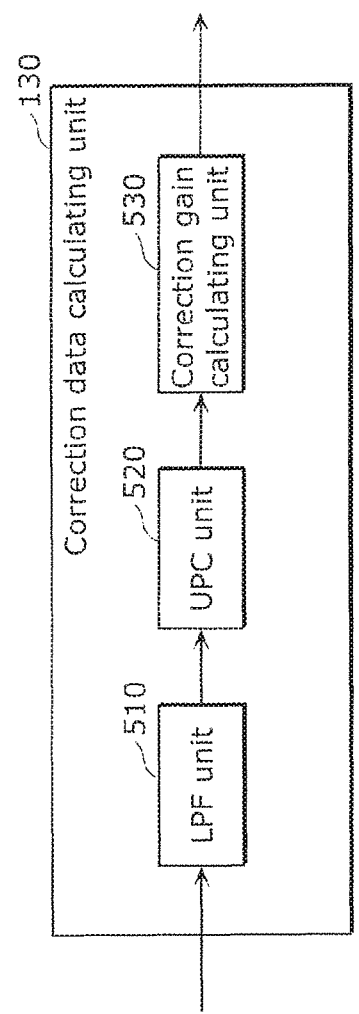
FIG. 5 is a block diagram illustrating a configuration of a correction data calculating unit.

FIG. 5 is a block diagram illustrating a configuration of the correction data calculating unit 130.

As illustrated in FIG. 5, the correction data calculating unit 130 is configured to include a low pass filter (LPF) unit 510, an up converter (UPC) unit 520, and a correction gain calculating unit 530.

The LPF 510 calculates, for each block, a modified feature quantity for a feature quantity (here, an average luminance of pixels) of a current block by performing low pass filtering using the feature quantity of a block located around the current block.

The UPC 520 calculates, for each block, a pixel feature quantity of each pixel in the current block by performing up conversion using the modified feature quantity of the current block and a modified feature quantity of a block located around the current block. Here, the up conversion is realized by performing linear interpolation operation using the modified feature quantity of the block to which a target pixel belongs and the modified feature quantity of the block located around the current block.

The correction gain calculating unit 530 calculates a correction gain which is correction data for correcting luminance of the pixels in a current frame to be processed, based on the pixel feature quantity calculated by the UPC unit 520.

With reference to FIG. 3 again, the configuration of the video signal processing device 10 is further described.

When the correction data (here, the correction gain) for the pixels in each nth block has been calculated by the correction data calculating unit 130, the correcting unit 140 corrects the luminance values of the pixels in the nth block, based on the correction data (here, the correction gain) for the pixels. In other words, the correcting unit 140 corrects the luminance values of the pixels in the nth block by multiplying the luminance values of the pixels by the correction gain for the pixels.

For example, when the first correction data has been calculated by the correction data calculating unit 130, the correcting unit 140 corrects the luminance of each pixel included in the first block in a current frame to be processed, based on the first correction data. In other words, the correcting unit 140 corrects the luminance values of the pixels in the first block by multiplying the luminance values of the pixels by the pixel gain for the pixels.

For example, when the correction data for lowermost blocks has been calculated by the correction data calculating unit 130, the correcting unit 140 corrects the luminance of each pixel in the lowermost block of the current frame to be processed, based on the correction data for the lowermost block. In other words, the correcting unit 140 corrects the luminance values of the pixels in the lowermost block by multiplying the luminance values of the pixels by the pixel gain for the pixels.

For example, when the second correction data has been calculated by the correction data calculating unit 130, the correcting unit 140 corrects the luminance of each pixel in the second block in the current frame to be processed, based on the second correction data. In other words, the correcting unit 140 corrects the luminance values of the pixels in the second block by multiplying the luminance values of the pixels by the pixel gain for the pixels.

In the video display apparatus 1 configured as described above, the video signal processing device 10 performs a unique operation.

Hereinafter, the operation performed by the video signal processing device 10 is described with reference to the drawings.

[Operation]

The video signal processing device 10 performs video signal processing as the unique operation.

This video signal processing is for calculating, for video signals of a plurality of frames which are temporally continuous and output from the external signal receiving device 20, correction data for correcting the luminance of pixels in the frames of the video signals, and correcting the luminance of the video signals using the calculated correction data to generate corrected video signals having the corrected luminance.

Figure 6:
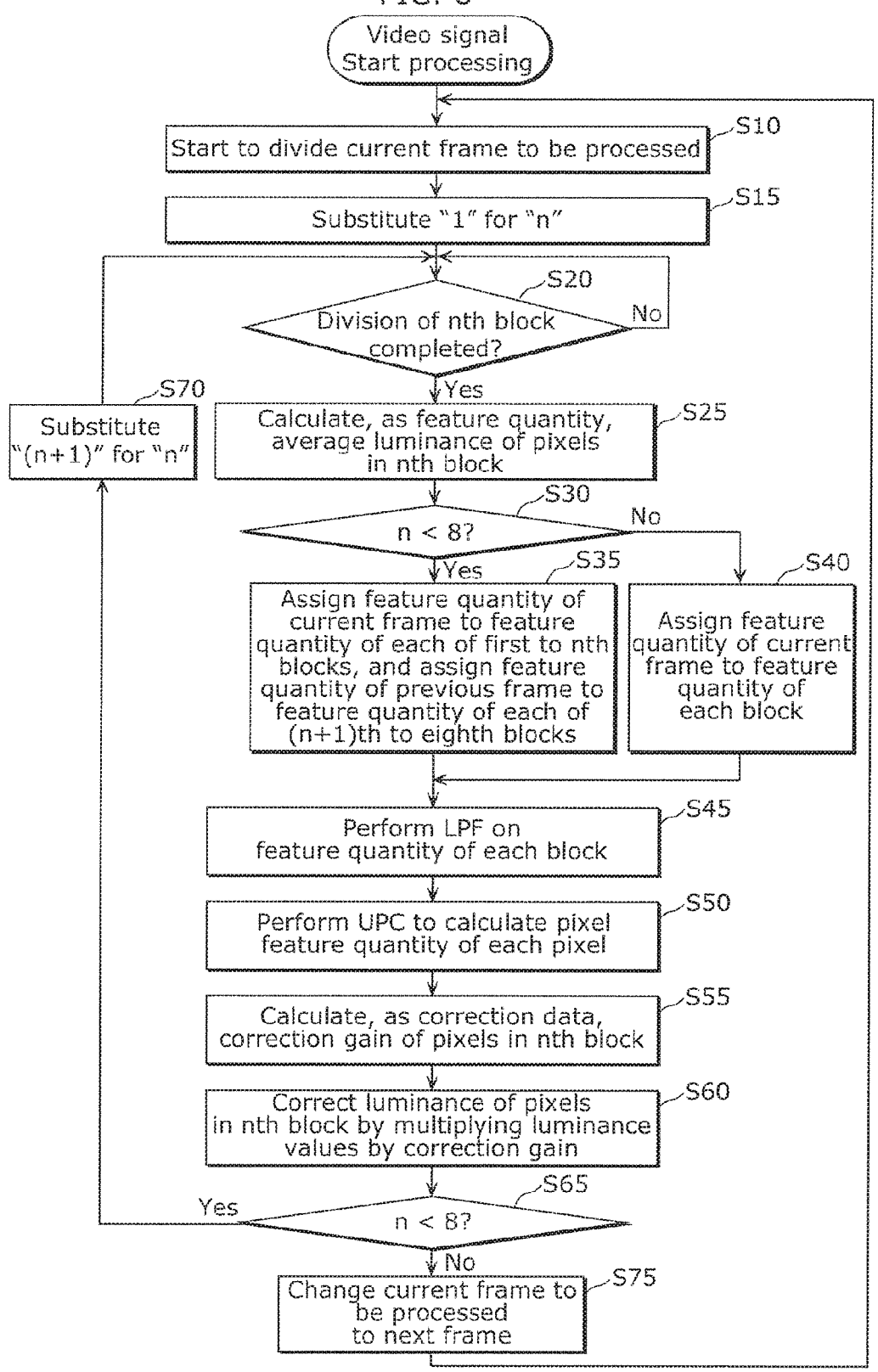
FIG. 6 is a flowchart of video signal processing.

FIG. 6 is a flowchart of video signal processing.

The video signal processing is started by means of data corresponding to the second frame in the video signals of a plurality of frames which are temporally continuous and output by the external signal receiving apparatus 20 is started to be input to the video signal processing device 10.

When the video signal processing is started, the dividing unit 110 starts to divide a current frame to be processed (Step S10). Here, the dividing unit 110 divides the current frame to be processed into eighty blocks by dividing the current frame by 8 along horizontal boundaries and by 10 along vertical boundaries. It is not always necessary to start to divide the frame waiting until all data corresponding to the current frame to be processed is completely input to the dividing unit 110. Here, the dividing unit 110 divides a first block when data corresponding to all the pixels above a first horizontal boundary is input without waiting input of data corresponding to the pixels below the first horizontal boundary. Subsequently, the dividing unit 110 divides a second block when data corresponding to all the pixels above a second horizontal boundary is input without waiting input of data corresponding to the pixels below the second horizontal boundary. In this way, blocks are divided sequentially starting with the first block and ending with an eighth block in such a manner that division of the (n−1)th block is finished, data of all the pixels above the nth horizontal boundary is input, and then the nth block is divided without waiting the input of the data of the pixels below the nth horizontal boundary.

When the current frame to be processed is started to be divided, the feature quantity calculating unit 120 substitutes "1" for a variable "n" which can be an integer of 1 or larger (Step S15).

When "1" is substituted for variable "n", the feature quantity calculating unit 120 waits until the division of the nth block is completed by the dividing unit 110 (the determination result of Step S20 is No).

When the division of each nth block is completed by the dividing unit 110 (the determination result of Step S20 is Yes), the feature quantity calculating unit 120 calculates, as a feature quantity of the nth block, an average luminance of the pixels in the nth block (Step S25).

When the feature quantity of the nth block is calculated, the correction data calculating unit 130 checks whether or not the value of a variable "n" is "8" or not (Step S30).

When Step S30 shows that the value of the variable "n" is not "8" (the determination result of Step S30 is No), the correction data calculating unit 130 assigns a feature quantity of the current frame to be processed (current frame) to a feature quantity of each of the first to nth blocks, and assigns a feature quantity of the frame which has been processed immediately before the current frame (a previous frame) to a feature quantity of each of the (n+1)th to eighth blocks (Step S35).

When Step S30 shows that the value of the variable "n" is "8" (the determination result of Step S30 is Yes), the correction data calculating unit 130 assigns the feature quantity of the current frame to be processed (current frame) to a feature quantity of each block (Step S40). Here, each block means each of the first to eighth blocks.

When the processing in Steps S30 and S40 has been finished, the LPF unit 510 performs low pass filtering (LPF) on the feature quantity of each block using the assigned feature quantity to calculate a modified feature quantity of the block (Step S45). Here, each block means each of the first to eighth blocks.

When the modified feature quantity of each block is calculated, the UPC unit 520 performs up conversion (UPC) using the modified feature quantity of the block calculated by the UPF unit 510 to calculate the pixel feature quantity of each pixel in the nth block (Step S50).

When the pixel feature quantity of each pixel is calculated, the correction data calculating unit 130 calculates, as correction data, a correction gain which is correction data for pixels in the nth block, based on the pixel feature quantity of the pixel calculated by the UPC unit 520 (Step S55).

When the correction gain for the pixels in the nth block of the current frame to be processed is calculated, the correcting unit 140 corrects luminance of each of the pixels in the nth block by multiplying the luminance value of the pixel in the nth block by the correction gain which is the correction data for the pixel (Step S60).

When the luminance of each pixel in the nth block is corrected, the feature quantity calculating unit 120 checks whether the value of the variable "n" is smaller than "8" or not (Step S65).

When Step S65 shows that the value of the variable "n" is smaller than "8" (the determination result of Step S65 is Yes), the feature quantity calculating unit 120 substitutes "(n+1)" for the variable "n" (Step S70).

When the processing in Step S70 is finished, the video signal processing device 10 proceeds to the processing in Step S20, and repeats the processing in Step S20 and the following steps.

When Step S65 shows that the value of the variable "n" is not smaller than "8" (the determination result of Step S65 is No), the video signal processing device 10 changes the current frame to be processed from the current frame to the next frame (Step S75), proceeds to Step S10, and repeats the processing in Step S10 and the following steps.

[Consideration]

By means of the video signal processing device 10 performing the video signal processing, both of the feature quantity of each block in the current frame to be processed and the feature quantity of each block in the previous frame which has been processed immediately before the current frame are reflected in the correction of the luminance of the current frame to be processed.

In contrast, for example, when luminance of pixels is corrected using the technique disclosed in PTL 1, the luminance of a current frame to be processed is corrected based only on data of the current frame to be processed, and thus no feature of a previous frame is reflected in the correction of the luminance of the current frame.

In view of this, the video signal processing device 10 is capable of achieving smoother transition in luminance level between frames than conventional.

Embodiment 2

[Outline]

A video display apparatus according to Embodiment 2 is described here as an aspect of the present disclosure. The video display apparatus according to Embodiment 2 has a configuration which is partly different from the video display apparatus 1 according to Embodiment 1.

The video display apparatus 1 according to Embodiment 1 is an example configured so that the video signal processing device 10 calculates an average luminance of pixels in a block as a feature quantity of the block, and calculates, as correction data, a correction gain for the pixels.

On the other hand, the video display apparatus according to Embodiment 2 is an example configured so that a video signal processing device calculates a histogram of luminance of pixels included in a block as a feature quantity of the block, and calculates, as correction data, a correction function with a variable indicating luminance of a pixel.

Hereinafter, the video display apparatus according to Embodiment 2 is described in detail with reference to the drawings, focusing on the differences from the video display apparatus 1 according to Embodiment 1.

[Configuration]

Figure 7:
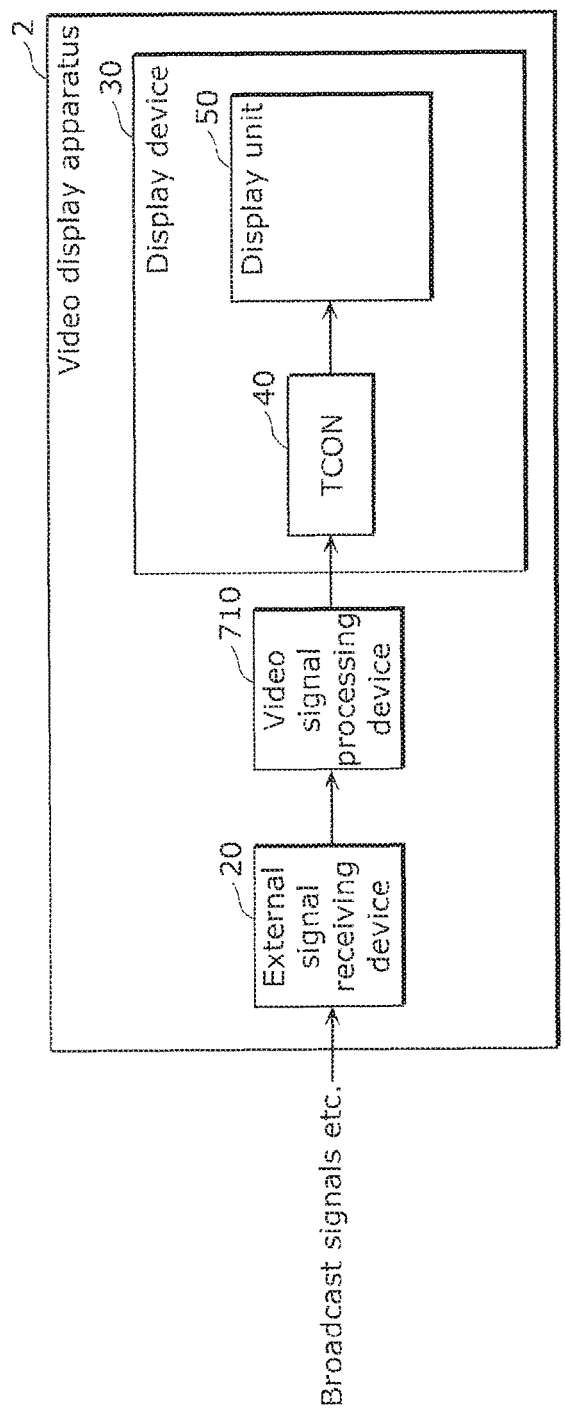
FIG. 7 is a block diagram illustrating a configuration of the video display apparatus.

FIG. 7 is a block diagram illustrating a configuration of the video display apparatus 2 according to Embodiment 2.

As illustrated in FIG. 7, the video display apparatus 2 is configured to include a video signal processing device 710 which is a replacement for the video signal processing device 10 in the video display apparatus 1 according to Embodiment 1.

The video signal processing device 710 processes video signals of a plurality of frames which are temporally continuous and output from the external signal receiving device 20, in time order of the plurality of frames, in the same manner as in the case of the video signal processing device 10 according to Embodiment 1. In other words, the video signal processing device 710 calculates correction data for correcting the luminance of the pixels included in each frame, and based on the calculated correction data, generates corrected video signals of the frames having the corrected luminance. Subsequently, the video signal processing device 710 outputs the generated corrected video signals to the display device 30.

The video signal processing device 710 is different from the video signal processing device 10 according to Embodiment 1, in the feature quantity and correction data for each block which is calculated in the process of generating corrected video signals.

More specifically, the video signal processing device 710 calculates, as a feature quantity of a block, a histogram of the luminance of the pixels in the block, while the video signal processing device 10 according to Embodiment 1 calculates, as a feature quantity of a block, an average luminance of the pixels in the block.

In addition, the video signal processing device 710 calculates, as correction data, a correction function with a variable indicating luminance of a pixel, while the video signal processing device 10 according to Embodiment 1 calculates, as correction data, a correction gain for the pixels.

Figure 8:
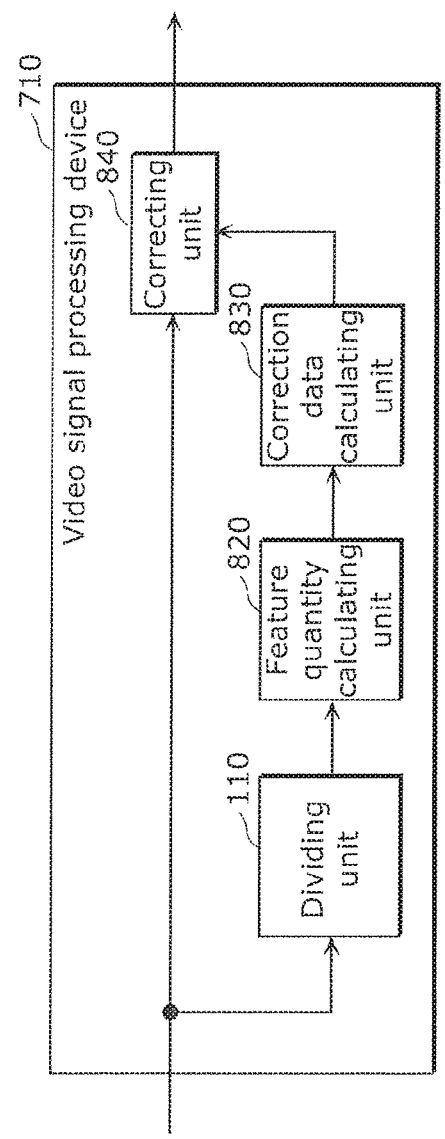
FIG. 8 is a block diagram illustrating a configuration of the video signal processing device.

FIG. 8 is a block diagram illustrating a configuration of the video signal processing device 710.

As illustrated in FIG. 8, the video signal processing device 710 is configured to include a feature quantity calculating unit 820, a correction data calculating unit 830, and a correcting unit 840 as replacements for the feature quantity calculating unit 120, the correction data calculating unit 130, and the correcting unit 140, respectively, in the video signal processing device 10 according to Embodiment 1.

The feature quantity calculating unit 820 calculates, as a feature quantity, a histogram of luminance of the pixels in each block divided by the dividing unit 110.

The feature quantity calculating unit 820 sequentially calculates feature quantities starting with the block located at the uppermost side of the frame toward the lower side, as performed by the feature quantity calculating unit 120 according to Embodiment 1.

Figure 9:
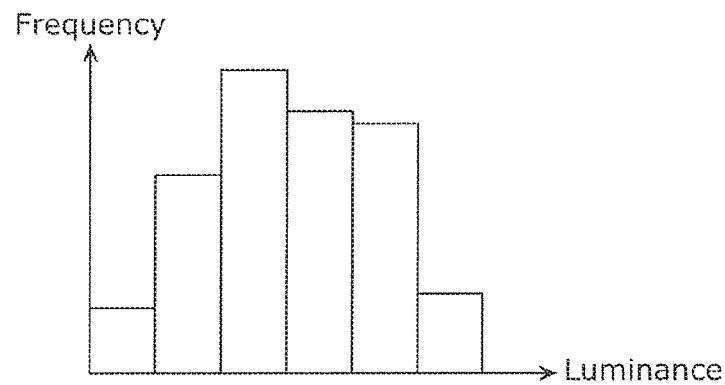
FIG. 9 is a diagram illustrating an example of a luminance histogram.

FIG. 9 is a diagram illustrating an example of a histogram of luminance calculated by the feature quantity calculating unit 820.

When the feature quantity calculating unit 820 calculates the feature quantity of each of the blocks above the nth horizontal boundary, the correction data calculating unit 830 calculates, as correction data, a correction function for correcting the luminance of the pixels in the nth block, based on the feature quantity of each of the blocks above the nth horizontal boundary in the current frame to be processed and the feature quantity of each of the blocks located below the nth horizontal boundary in the previous frame which has been processed immediately before the current frame.

When the feature quantities of all blocks in the current frame to be processed have been calculated by the feature quantity calculating unit 820, the correction data calculating unit 830 calculates, as correction data, a correction function for correcting luminance of the pixels in each eighth block located below a seventh horizontal line in the current frame, based on the feature quantity of each block of the current frame.

Figure 10:
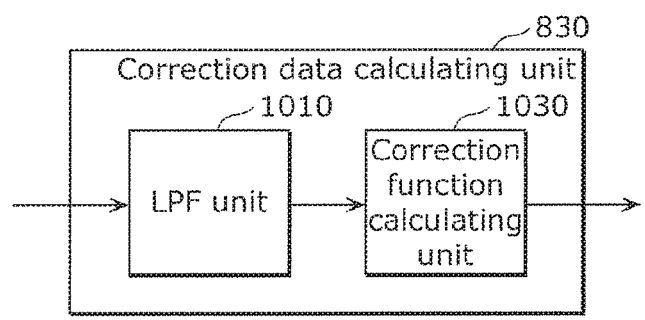
FIG. 10 is a block diagram illustrating a configuration of a correction data calculating unit.

FIG. 10 is a block diagram illustrating a configuration of the correction data calculating unit 830.

As illustrated in FIG. 10, the correction data calculating unit 830 is configured: to include an LPF unit 1010 and a correction function calculating unit 1030 as replacements for the LPF unit 510 and the correction gain calculating unit 530, respectively, in the correction data calculating unit 130 in Embodiment 1; and not to include any UPC unit corresponding to the UPC unit 520 in the correction data calculating unit 130.

The LPF unit 1010 calculates a modified feature quantity by performing low pass filtering on the feature quantity (here, a histogram of luminance) of each current block, using the feature quantity of a block adjacent to the current block.

The correction function calculating unit 1030 calculates, for each block calculated by the LPF unit 1010, a correction function with a variable indicating luminance of a pixel. The correction function is for correcting luminance of each pixel in the block based on the modified feature quantity of the block. Here, the correction function is calculated using, for example, a method for calculating a correction function with a variable indicating luminance of a pixel based on the histogram of luminance disclosed in PTL 1.

Figure 11:
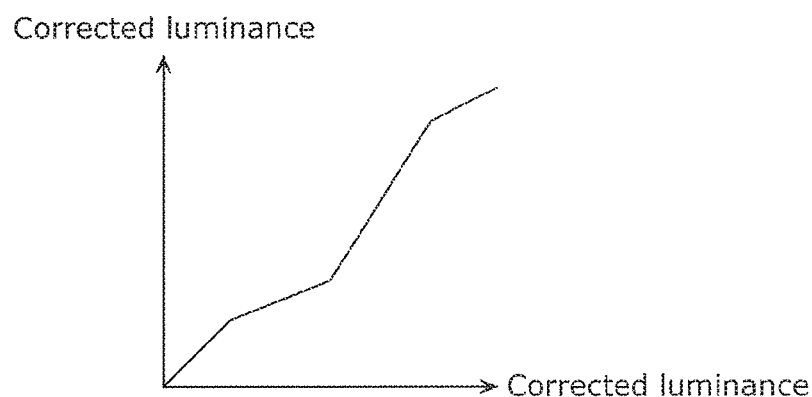
FIG. 11 is a diagram illustrating an example of a correction function.

FIG. 11 is a diagram illustrating an example of a correction function calculated by the correction function calculating unit 1030.

As illustrated in FIG. 11, the correction function calculated by the correction function calculating unit 1030 is a function which is represented by a combination of a correction gain and a correction offset.

With reference to FIG. 8 again, the configuration of the video signal processing device 710 is further described.

When correction data (here, a correction function) for each pixel in each nth block has been calculated by the correction data calculating unit 830, the correcting unit 840 corrects luminance of the pixel in the nth block by correcting the luminance value of the pixel, based on corresponding correction data (here, the correction function). In short, the correcting unit 840 corrects the luminance of the pixel by applying the correction function calculated by the correction data calculating unit 830 to each pixel in the nth block.

In the video display apparatus 2 configured as described above, the video signal processing device 710 performs a unique operation.

Hereinafter, the operation performed by the video signal processing device 710 is described with reference to the drawings.

[Operation]

The video signal processing device 710 performs, as a unique operation, modified video signal processing which is partly different from the video signal processing performed by the video signal processing device 10 according to Embodiment 1.

Figure 12:
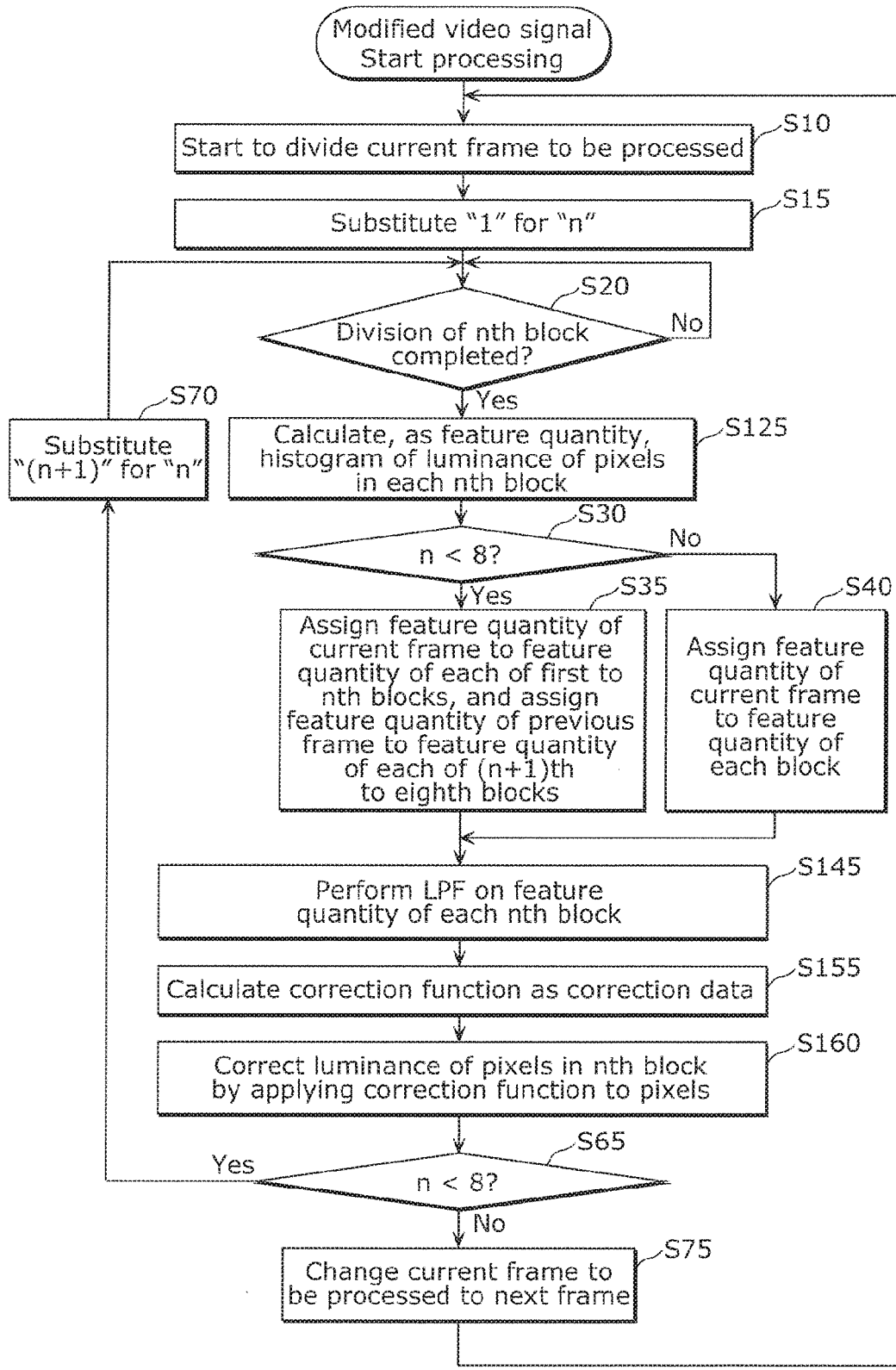
FIG. 12 is a flowchart of modified video signal processing.

FIG. 12 is a flowchart of modified video signal processing.

The modified video signal processing is started by means of data of the second frame among a plurality of frames which are temporally continuous in the video signals output by the external signal receiving apparatus 20 is started to be input to the video signal processing device 710, as in the case of the video signal processing according to Embodiment 1.

As illustrated in FIG. 12, the modified video signal processing is different from the video signal processing (see FIG. 6) according to Embodiment 1 in the points of: including Step S125 instead of Step S25; including Step S145 instead of Step S45; not including any step corresponding to Step S50; including Step S155 instead of Step S55; and including Step S160 instead of Step S60.

Here, the modified video signal processing is described focusing on the modified processes.

When division of each nth block is completed by the dividing unit 110 (the determination result of Step S20 is Yes) in the processing of Step S20, the feature quantity calculating unit 820 calculates, for each nth block, a histogram of luminance of the pixels in the block as a feature quantity of the block (Step S125). Subsequently, a transition is made to the processing of Step S30.

When the processing in Step S30 or S40 has been finished, the LPF unit 1010 performs low pass filtering (LPF) on the feature quantity of each block using an assigned feature quantity to calculate a modified feature quantity of the nth block (Step S145). Here, the feature quantity is a histogram of luminance. For this reason, the low pass filtering which is performed on the histogram of luminance means low pass filtering which is performed on the histogram of luminance on a per luminance range in the histogram basis.

When the modified feature quantity of each nth block has been calculated, based on the calculated modified feature quantity, the correction function calculating unit 1030 calculates, as correction data, a correction function with a variable indicating luminance of a pixel (Step S155). The correction function is for correcting the luminance of each pixel in the block.

When the correction function of each nth block has been calculated, the correcting unit 840 corrects the luminance of each pixel in the nth block by applying the correction function calculated by the correction data calculating unit 830 to the pixel in the nth block (Step S160). Subsequently, a transition is made to the processing of Step S65.

[Consideration]

By means of the video signal processing device 710 performing the modified video signal processing, both of the feature quantity of each block in the current frame to be processed and the feature quantity of each block in the previous frame processed immediately before the current frame are reflected in the correction of the luminance of the current frame to be processed, as in the case of the video signal processing device 10 according to Embodiment 1.

In view of this, the video signal processing device 710 is capable of achieving smoother transition in luminance level between frames than conventional, as in the case of the video signal processing device 10 according to Embodiment 1.

[Variations]

The video signal processing device 10 according to an aspect of the present disclosure has been described above based on Embodiment 1, and the video signal processing device 710 according to an aspect of the present disclosure has been described above based on Embodiment 2.

The video signal processing device 10 and the video signal processing device 710 can be further modified, for example, as indicated below. As a matter of course, video signal processing devices according to aspects of the present disclosure are not limited to the video signal processing devices as described in the above embodiments.

(1) In Embodiment 1, the video signal processing device 10 has been described as being disposed at a location which is inside of the video display apparatus 1 and outside of the display device 30. However, the video signal processing device 10 does not always need to be disposed at the location as described as an example in Embodiment 1, as long as the video signal processing device 10 is disposed between the external signal receiving device 20 and the TCON 40. Conceivable examples include an example in which the video signal processing device 10 is disposed inside of the display device 30 and outside of the TCON 40, and an example in which the video signal processing device 10 is disposed inside of the TCON 40. An example in which the video signal processing device 10 is disposed inside of an external device for the video display apparatus 1 is further conceivable.

(2) In Embodiment 1, each of the video signal processing device 10 and the TCON 40 has been described as being implemented as an integrated circuit called LSI. However, the video signal processing device 10 and the TCON 40 do not always need to be implemented as individual integrated circuits. For example, the video signal processing device 10 and the TCON 40 may be implemented as a one-chip integrated circuit including part or all of the video signal processing device 10 and the TCON 40, or a one-chip integrated circuit including the video signal processing device 10 and the TCON 40 together with other one or more devices.

Furthermore, the video signal processing device 10 and the TCON 40 can be implemented using various methods for configuring them as one or more integrated circuits. For example, the video signal processing device 10 and the TCON 40 may be implemented as either one or more exclusive circuits, one or more general processors which execute programs, one or more field programmable gate arrays (FPGAs) that are programmable after the LSIs are manufactured, or one or more reconfigurable processors in which connections and settings of circuit cells inside the LSI are reconfigurable.

(3) In Embodiment 1, the external signal processing device 20 has been described as being disposed inside of the video display device 1 as illustrated in FIG. 2. However, the external signal receiving device 20 does not always need to be disposed at the location as described as an example in Embodiment 1, as long as the external signal receiving device 20 can transmit video signals to the video signal processing device 10. Conceivable examples include an example in which the external signal receiving device 20 is disposed in an external device which transmits video signals to the video display apparatus 1. The external device may be a hard disc recorder, a DVD recorder, a BD (Blu-ray (registered trademark) disc) recorder, or the like.

(4) In Embodiment 1, the video display apparatus 1 has been described as being the television. However, the video display apparatus 1 does not always need to be a television set as long as the video display apparatus 1 has a function for displaying video. For example, a mobile terminal such as a tablet having a display is conceivable as an example.

(5) In Embodiment 1, the dividing unit 110 has been described as a unit which divides the current frame to be processed into the eighty blocks by dividing the current frame by 10 along the horizontal boundaries and by 8 along the vertical boundaries. However, the dividing unit 110 does not always need to divide the current frame as described in Embodiment 1. The dividing unit 110 may divide a current frame along one or more horizontal dividing lines and zero or more dividing vertical lines. Examples include an example in which the dividing unit 110 divides a current frame to be processed into one-hundred fifty blocks by dividing the current frame into fifteen segments along horizontal boundaries and into ten segments along vertical lines.

(6) Examples of the video signal processing method, the integrated circuit for video signal processing, and the video signal processing device according to aspects of the present disclosure are described further below.

(a) A video signal processing method according to an aspect of the present disclosure is a video signal processing method for processing video signals of a plurality of frames which are temporally continuous, in time order of the plurality of frames, the video signal processing method including: dividing a current frame which is to be processed into a plurality of blocks using a same dividing method as used for the plurality of frames, the plurality of blocks being predetermined rectangular blocks; calculating, for each of the plurality of blocks divided into in the dividing, a feature quantity relating to luminance of pixels in the block; calculating first correction data, based on a feature quantity calculated from each of first blocks located above a first horizontal boundary in the current frame and a feature quantity calculated from each of one or more blocks located below a first horizontal boundary in a previous frame which has been processed immediately before the current frame; and correcting luminance of pixels in each of the first blocks in the current frame, based on the first correction data calculated in the calculating.

According to the video signal processing method, luminance of pixels of each first block in the current frame to be processed is corrected based on both of the feature quantity relating to the luminance of the block in the current frame and the feature quantity indicating the luminance of the block in the previous frame which has been processed immediately before the current frame.

Accordingly, the video signal processing method makes it possible to achieve smoother transition in luminance level between frames than conventional.

(b) In addition, in the dividing, the current frame may be divided using, as one or more dividing boundaries, one or more horizontal dividing lines including the first horizontal boundary and zero or more vertical dividing lines, when in the calculating of a feature quantity, the feature quantity of each of the plurality of blocks in the current frame has been calculated in such a manner that the feature quantity of each of blocks located above a lowermost horizontal boundary has been calculated first, and then the feature quantity of each of blocks located below the lowermost horizontal boundary has been calculated, the lowermost horizontal boundary being the horizontal dividing line located at a lowermost side of the current frame, in the calculating of first correction data, correction data for lowermost blocks may be calculated based on the feature quantity calculated from each of the blocks in the current frame, and when the correction data for the lowermost blocks has been calculated in the calculating of first correction data, in the correcting, luminance of pixels in the lowermost blocks of the current frame may be corrected based on the correction data for the lowermost blocks.

In this way, compared to each first block, each lowermost block is more influenced by feature quantities of the current frame than by feature quantities of the previous frame. For this reason, it is possible to correct luminance of the current frame so that the influence of the feature quantities of the current frame becomes larger from the first block side to the lowermost block side.

(c) In addition, when: in the dividing, the current frame has been divided along dividing boundaries including horizontal dividing lines including a first horizontal boundary and a second horizontal boundary which is located below and adjacent to the first horizontal boundary and above the lowermost horizontal boundary; and in the calculating of a feature quantity, the feature quantity of each of the first blocks has been calculated first, and then the feature quantity of each of second blacks located between the first horizontal boundary and the second horizontal boundary has been calculated, in the calculating of first correction data, second correction data may further be calculated based on the feature quantity calculated from each of the first blocks and the second blocks in the current frame and the feature quantity calculated from each of the blocks located below a second horizontal boundary in the previous frame, and in the correcting, luminance of pixels in the second block of the current frame may be corrected based on the second correction data calculated in the calculating.

In this way, compared to each first block, each second block is more influenced by feature quantities of the current frame than by feature quantities of the previous frame. For this reason, it is possible to correct luminance of the current frame so that the influence of the feature quantities of the current frame becomes larger from the first block side to the second block side.

(d) In addition, in the calculating, an average luminance of pixels in a current block to be processed may be calculated as the feature quantity.

In this way, it is possible to perform luminance correction which achieves a sufficient quality and comparatively small calculation amount.

(e) In addition, in the calculating, a histogram of luminance of pixels in a current block to be processed may be calculated as the feature quantity.

In this way, it is possible to perform luminance correction which achieves a sufficient quality and comparatively small calculation amount.

(f) In addition, in the calculating, a modified feature quantity may be calculated for each current block by performing low pass filtering on a feature quantity of the current block based on a feature quantity of a block located around the current block, and the first correction data may be calculated based on the calculated modified feature quantity of the current block.

In this way, it is possible to perform luminance correction so that the influence of a distant block is reduced.

(g) In addition, in the calculating, a pixel feature quantity of each pixel in the current block may be calculated by performing up conversion of the current block based on the modified feature quantity of the current block and a modified feature quantity of the block located around the current block, and the first correction data may be calculated based on the calculated pixel feature quantity of the pixel.

In this way, it is possible to perform luminance correction of each pixel so that the modified feature quantity of the block around the current block to which the pixel belongs is reflected in the luminance correction.

(h) An integrated circuit for video signal processing according to an aspect of the present disclosure is an integrated circuit for video signal processing, the integrated circuit being for processing video signals of a plurality of frames which are temporally continuous, in time order of the plurality of frames and including: a dividing unit configured to divide a current frame which is to be processed into a plurality of blocks using a same dividing method as used for the plurality of frames, the plurality of blocks being predetermined rectangular blocks; a feature quantity calculating unit configured to calculate, for each of the plurality of blocks divided into in the dividing, a feature quantity relating to luminance of pixels in the block; a correction data calculating unit configured to calculate first correction data, based on a feature quantity calculated from each of first blocks located above a first horizontal boundary in the current frame and a feature quantity calculated from each of one or more blocks located below a first horizontal boundary in a previous frame which has been processed immediately before the current frame; and a correcting unit configured to correct luminance of pixels in each of the first blocks in the current frame, based on the first correction data calculated in the calculating.

According to the integrated circuit for the video signal processing method, luminance of pixels of each first block in the current frame to be processed is corrected based on both of the feature quantity relating to the luminance of the block included in the current frame to be processed and the feature quantity indicating the luminance of the block in the previous frame which has been processed immediately before the current frame.

Accordingly, the integrated circuit for the video signal processing method can achieve smoother transition in luminance level between frames than conventional.

(i) A video signal processing device according to an aspect of the present disclosure is a video signal processing device which processes video signals of a plurality of frames which are temporally continuous, in time order of the plurality of frames, the video signal processing device including: a dividing unit configured to divide a current frame which is to be processed into a plurality of blocks using a same dividing method as used for the plurality of frames, the plurality of blocks being predetermined rectangular blocks; a feature quantity calculating unit configured to calculate, for each of the plurality of blocks divided into in the dividing, a feature quantity relating to luminance of pixels in the block; a correction data calculating unit configured to calculate first correction data, based on a feature quantity calculated from each of first blocks located above a first horizontal boundary in the current frame and a feature quantity calculated from each of one or more blocks located below a first horizontal boundary in a previous frame which has been processed immediately before the current frame; and a correcting unit configured to correct luminance of pixels in each of the first blocks in the current frame, based on the first correction data calculated in the calculating.

According to the video signal processing device, the luminance of pixels of each first block in the current frame to be processed is corrected based on both of the feature quantity relating to the luminance of the block in the current frame and the feature quantity indicating the luminance of the block in the previous frame which has been processed immediately before the current frame.

Accordingly, the video signal processing device can achieve smoother transition in luminance level between frames than conventional.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable to a video signal processing device which processes a video signal including a plurality of frames.

The invention claimed is:
1. A video signal processing method for processing video signals of a plurality of frames which are temporally continuous, in time order of the plurality of frames, the video signal processing method comprising:
dividing a current frame which is to be processed into a plurality of blocks using a same dividing method as used for the plurality of frames, the plurality of blocks being predetermined rectangular blocks;
calculating, for each of the plurality of blocks divided into in the dividing, a feature quantity relating to luminance of pixels in the block;
calculating first correction data, based on a feature quantity calculated from each of first blocks located above a first horizontal boundary in the current frame and a feature quantity calculated from each of one or more blocks located below a first horizontal boundary in a previous frame which has been processed immediately before the current frame; and
correcting luminance of pixels in each of the first blocks in the current frame, based on the first correction data calculated in the calculating.

2. The video signal processing method according to claim 1,
wherein in the dividing, the current frame is divided using, as one or more dividing boundaries, one or more horizontal dividing lines including the first horizontal boundary and zero or more vertical dividing lines,
when in the calculating of a feature quantity, the feature quantity of each of the plurality of blocks in the current frame has been calculated in such a manner that the feature quantity of each of blocks located above a lowermost horizontal boundary has been calculated first, and then the feature quantity of each of blocks located below the lowermost horizontal boundary has been calculated, the lowermost horizontal boundary being the horizontal dividing line located at a lowermost side of the current frame,
in the calculating of first correction data, correction data for lowermost blocks is calculated based on the feature quantity calculated from each of the blocks in the current frame, and
when the correction data for the lowermost blocks has been calculated in the calculating of first correction data,
in the correcting, luminance of pixels in the lowermost blocks of the current frame is corrected based on the correction data for the lowermost blocks.

3. The video signal processing method according to claim 2,
wherein when: in the dividing, the current frame has been divided along dividing boundaries including horizontal dividing lines including a first horizontal boundary and a second horizontal boundary which is located below and adjacent to the first horizontal boundary and above the lowermost horizontal boundary; and in the calculating of a feature quantity, the feature quantity of each of the first blocks has been calculated first, and then the feature quantity of each of second blocks located between the first horizontal boundary and the second horizontal boundary has been calculated,
in the calculating of first correction data, second correction data is further calculated based on the feature quantity calculated from each of the first blocks and the second blocks in the current frame and the feature quantity calculated from each of the blocks located below a second horizontal boundary in the previous frame, and
in the correcting, luminance of pixels in the second block of the current frame is corrected based on the second correction data calculated in the calculating.

4. The video signal processing method according to claim 1,
wherein in the calculating, an average luminance of pixels in a current block to be processed is calculated as the feature quantity.

5. The video signal processing method according to claim 1,
wherein in the calculating, a histogram of luminance of pixels in a current block to be processed is calculated as the feature quantity.

6. The video signal processing method according to claim 1,
wherein in the calculating, a modified feature quantity is calculated for each current block by performing low pass filtering on a feature quantity of the current block based on a feature quantity of a block located around the current block, and the first correction data is calculated based on the calculated modified feature quantity of the current block.

7. The video signal processing method according to claim 6,
wherein in the calculating, a pixel feature quantity of each pixel in the current block is calculated by performing up conversion of the current block based on the modified feature quantity of the current block and a modified feature quantity of the block located around the current block, and the first correction data is calculated based on the calculated pixel feature quantity of the pixel.

8. An integrated circuit for video signal processing, the integrated circuit being for processing video signals of a plurality of frames which are temporally continuous, in time order of the plurality of frames and comprising:
a dividing unit configured to divide a current frame which is to be processed into a plurality of blocks using a same dividing method as used for the plurality of frames, the plurality of blocks being predetermined rectangular blocks;
a feature quantity calculating unit configured to calculate, for each of the plurality of blocks divided into in the dividing, a feature quantity relating to luminance of pixels in the block;
a correction data calculating unit configured to calculate first correction data, based on a feature quantity calculated from each of first blocks located above a first horizontal boundary in the current frame and a feature quantity calculated from each of one or more blocks located below a first horizontal boundary in a previous frame which has been processed immediately before the current frame; and
a correcting unit configured to correct luminance of pixels in each of the first blocks in the current frame, based on the first correction data calculated in the calculating.

9. A video signal processing device which processes video signals of a plurality of frames which are temporally continuous, in time order of the plurality of frames, the video signal processing device comprising:
a dividing unit configured to divide a current frame which is to be processed into a plurality of blocks using a same dividing method as used for the plurality of frames, the plurality of blocks being predetermined rectangular blocks;
a feature quantity calculating unit configured to calculate, for each of the plurality of blocks divided into in the dividing, a feature quantity relating to luminance of pixels in the block;
a correction data calculating unit configured to calculate first correction data, based on a feature quantity calculated from each of first blocks located above a first horizontal boundary in the current frame and a feature quantity calculated from each of one or more blocks located below a first horizontal boundary in a previous frame which has been processed immediately before the current frame; and
a correcting unit configured to correct luminance of pixels in each of the first blocks in the current frame, based on the first correction data calculated in the calculating.

* * * * *